United States Patent [19]

Cove et al.

[11] Patent Number: 4,461,316

[45] Date of Patent: Jul. 24, 1984

[54] DRILLING CHOKE

[75] Inventors: Harry R. Cove, Edmonton, Canada; John D. Muchow, Carson, Calif.

[73] Assignee: Hydril Company, Los Angeles, Calif.

[21] Appl. No.: 414,418

[22] Filed: Sep. 2, 1982

[51] Int. Cl.³ .................. F16K 1/34; F16K 37/00
[52] U.S. Cl. .................. 137/312; 137/557; 251/118; 251/363; 251/155
[58] Field of Search .............. 251/118, 155, 363; 137/557, 312

[56] References Cited

U.S. PATENT DOCUMENTS

| | | | |
|---|---|---|---|
| 2,108,234 | 2/1938 | Raymond | 251/363 X |
| 2,944,856 | 7/1960 | Swanson | 137/557 X |
| 3,027,916 | 4/1962 | Smith | 137/557 |

FOREIGN PATENT DOCUMENTS 1186275 2/1959 France.

Primary Examiner—Arnold Rosenthal
Attorney, Agent, or Firm—Dodge & Bush

[57] ABSTRACT

A fluid flow control valve especially adapted for use during well drilling operations as a drilling choke is disclosed. A replaceable ported seat and movable tubular flow control element cooperate to control flow through the angled body valve housing. The flow closure mechanism is operating fluid pressure balanced for ease of valve operation during extreme pressure working conditions. Internal flow control working parts of the valve are rugged in construction and assemblage. The portions of the valve subject to wear or flow erosion are also easily replaced when required. An indicator is arranged to signal incipient failure of the replaceable parts of the valve in order that they may be replaced prior to the occurrence of a major failure.

4 Claims, 3 Drawing Figures

DRILLING CHOKE

TECHNICAL FIELD

The technical field of the present invention is fluid flow control valves and, in particular, drilling choke type valves for controlling drilling fluid circulation flow during well drilling operations.

BACKGROUND ART

The control of the circulation of drilling fluids during hydrocarbon well drilling operations has presented a number of unique flow control problems. The presence of the earth cuttings and other highly abrasive solids in the drilling fluids have frequently interfered with or damaged the valve sufficiently to block operating movement of the flow closure elements. The presence in the drilling fluid of corrosive fluids that are encountered in the earth formations during drilling has in many instances resulted in sufficient corrosion of the valve working parts to render the valve ineffective. The valves were also extremely difficult to operate at the high working pressures unless a complicated arrangement for balancing urging of operating fluid pressure on the movable flow control components was provided. In addition, the high operating pressure of the drilling fluid often resulted in the restricted or throttled flow eroding or cutting the flow control components such as valve seats and can in time create a leakage flow path in the valve body itself.

Many drilling choke valves of rugged and simple construction and design have been developed in the past for use during drilling operations. Most drilling choke valves have also been made relatively easy to repair or otherwise maintain in the field. Despite such ease of maintenance, there has remained a need for a drilling choke valve that will indicate a failure condition is about to occur in order that preventative-type attention will be performed prior to failure. As valve failure would ordinarily result in loss of drilling fluid control and could ultimately result in loss of the well itself, such an indication of an incipient failure condition is a highly desirable valve characteristic or feature.

A flow control valve for similar usage is disclosed in copending application of John D. Muchow and Harry R. Cove, entitled "Valve Apparatus", Ser. No. 212,822, filed Dec. 4, 1980, and now abandoned, which is also assigned to the assignee of the present invention.

SUMMARY OF THE PRESENT INVENTION

The present invention relates to fluid flow control valves that are especially well suited for use during drilling operations of hydrocarbon wells. The drilling choke valve, which is operating fluid pressure balanced for ease of operation, is provided with easily replacable flow control components. An indicator is provided for signaling incipient failure of the replaceable wear and flow control parts in order that valve repairs may be effected prior to the valve being rendered inoperable for flow control purposes.

The preferred embodiment utilizes a right angled valve body or housing having flanged end connectors. A bolted bonnet that is easily removed to permit access to the valve interior for maintenance and assembly purposes is utilized. A flow throttling seat and erosion wear nozzle are secured in operating position and sealed to the valve body by the removable bonnet. A tubular flow control element is movably positioned within the ported seat and mounted on an operating stem that extends through the bonnet. The stem is moved by a suitable external actuator to position the flow control element relative to the seat to control flow through the valve.

DESCRIPTION OF THE PREFERRED EMBODIMENT

The valve apparatus of the present invention, generally designated A in the Figs., is utilized for controlling flow of fluids through a fluid containing conduit (not illustrated) in the usual manner. Preferably, the fluid flow control valve apparatus A of the present invention is used in controlling the flow of drilling fluids under the severe operating conditions usually encountered during earth drilling operations.

Figure 2:
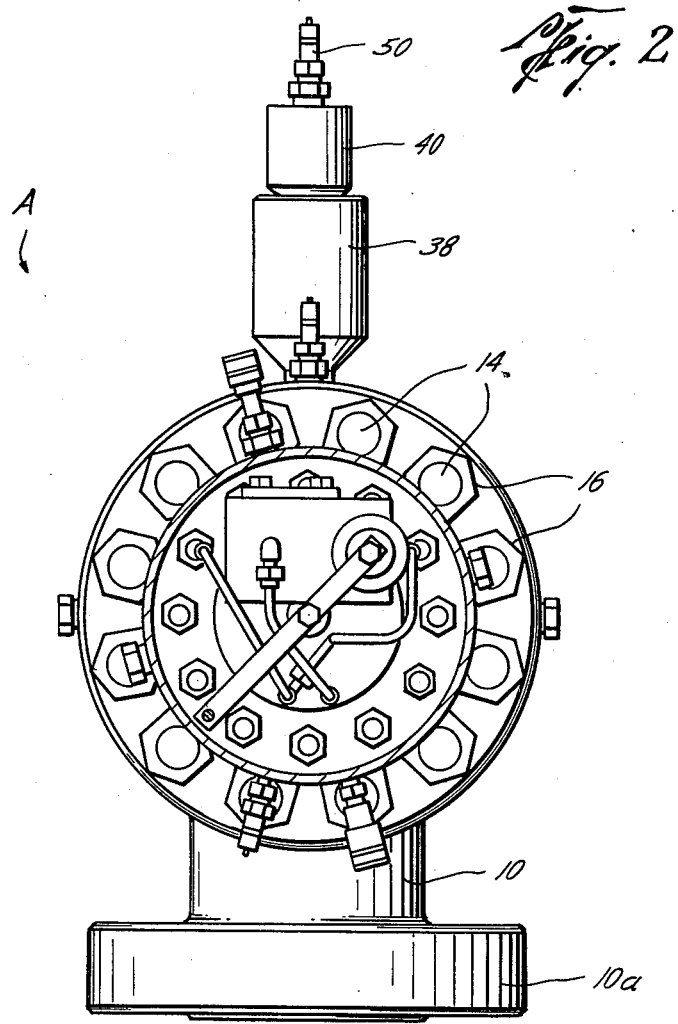
FIG. 2 is an exterior view of the valve of FIG. 1 taken from a different angle.

The valve apparatus A includes a valve housing, generally designated H formed by a Tee-angled valve body member 10 and valve bonnet 12 which is releasably secured thereto in the usual flanged manner by equi-circumferentially spaced helically threaded bolting 14 (FIG. 2) receiving rotatable securing nuts 16. An O-ring 11 seals between the body 10 and bonnet 12 to prevent leakage of fluid therebetween in the usual manner. The body 10 is preferably of the right-angled Tee-type provided with a flanged inlet end connection 10a and a corresponding flanged outlet end connection 10b for securing with the fluid containing conduit in the usual manner. It is, of course, understood that any other known suitable end connections may be formed on the valve body 10 without departing from the spirit of the present invention.

The valve body 10 has a fluid flow passage 18 formed therethrough which is secured by the end connection flanges 10a and 10b in flow communication with the flow conduit in order that the valve body 10 will form a portion of the fluid containing conduit. The internal flow passage 18 has a regular cylindrical inlet flow portion 18a disposed adjacent the inlet flange 10a and a regular cylindrical outlet flow portion 18b disposed adjacent the outlet flange 10b. The normal or desired flow direction of the fluid is from the inlet passage 18a into the outlet passage 18b which are arranged in flow communication and at right angles to each other. The longitudinal axes (not illustrated) defined by the cylindrical inlet portion 18a and the longitudinal axis of the cylindrical outlet portion 18b also preferably intersect at right angles to each other.

Disposed within the outlet portion 18b of the flow passage 18 is a tubular erosion control nozzle 20 and a tubular flow control seat 22. The flow control seat seal ring 24 engages the seat 22 for securing the seat 22 and erosion control nozzle 20 in the outlet portion 18b when the bonnet 12 is installed using the bolts 14 and nuts 16. An outwardly projecting collar 20a of the erosion control nozzle 20 limits movement of the nozzle 20 through the outlet portion 18b in the usual manner while a central passage 20b forms the desired path for the outlet flow. An O-ring 21 blocks leakage of fluid between the seat 22 and nozzle 20. The upper seal ring 24 carries alignment and anti-rotation pins 24a and 24b to prevent its relative rotational movement with either the seat 22 or bonnet 12, respectively. The seal ring 24 also carries O-rings 24c and 24d for sealing with the flow closure element 26 and bonnet 12, respectively, to control leakage of fluid therebetween.

Reciprocally disposed within the seat 22 and seal ring 24 is a sleeve or tubular flow closure element 26 that is operably connected with the valve stem 28 by threads 28a and lock nut 29. The valve stem 28 extends upwardly from the flow closure element 26 through a sealed opening 12a formed in the removable valve bonnet 12. The stem 28 is used to control the operating movement of the flow closure element 26 from exteriorly of the valve housing H in the usual manner. In the present instance, the stem 28 reciprocates the flow closure element 26 within the fixed seat 22 in the valve body 10 for controlling flow of fluid through the valve apparatus A.

The valve seat 22 is provided with a central passage 22a in which the flow control element 28 reciprocates and through which the fluid from the inlet portion 18a of the flow passage 18 flows into before flowing outwardly into passage 20b through the outlet portion 18b of the valve body 10. One or more flow throttling ports 22b are formed through the wall of the tubular seat member 22 for enabling communication from exteriorly of the seat 22 radially inwardly to the central portion 22a where it communicates in turn with the outlet portion 18b. Preferably, the ports 22b are radially opposed or oppositely positioned on the tubular seat member 22 in order that the inwardly flow into the bore 22a will impinge upon corresponding flow from the opposite port 22b for minimizing flow turbulence and flow cutting or erosion of the seat 22.

Figure 1:
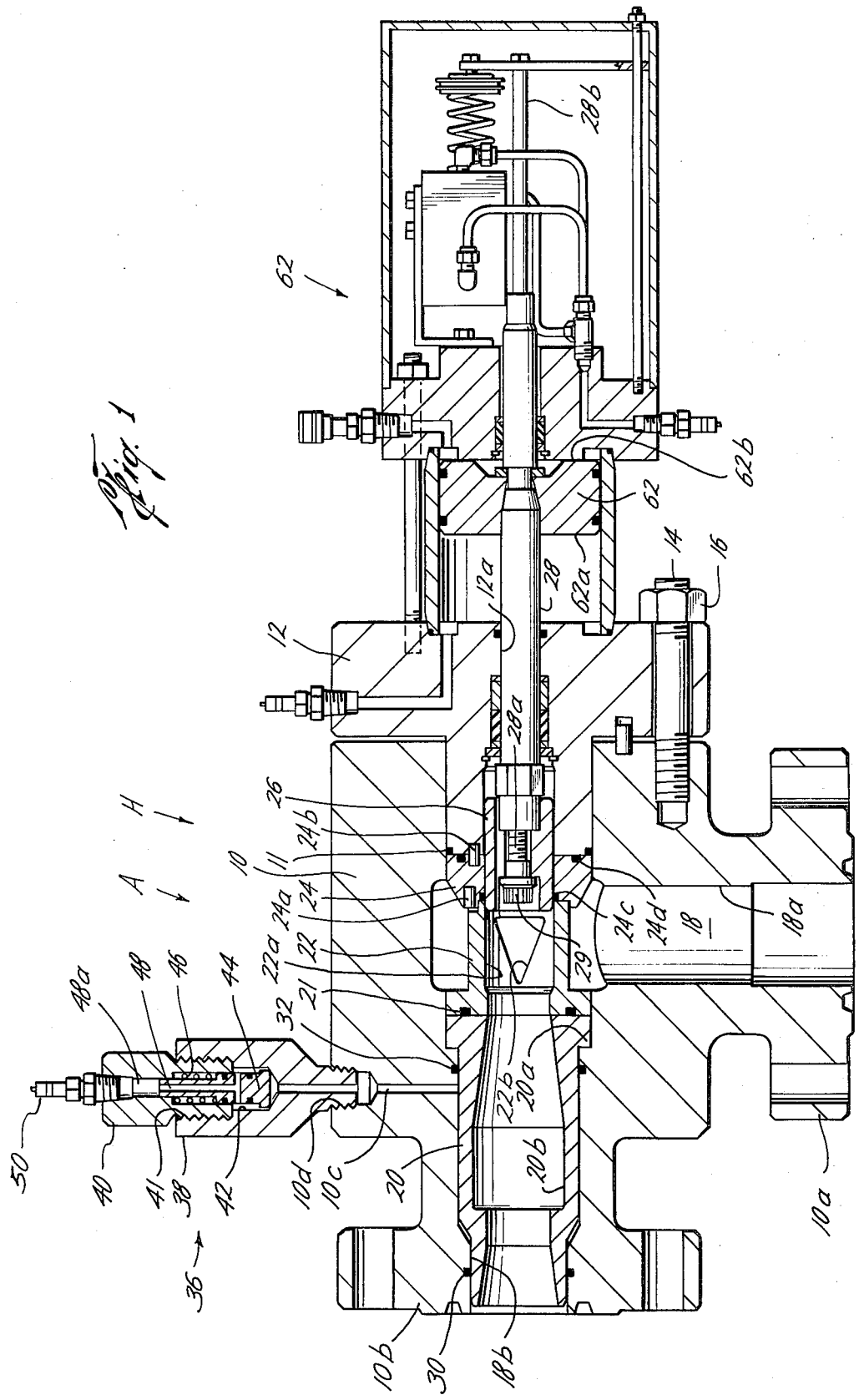
FIG. 1 is a side view in section of a fluid flow control valve of the present invention operated to the open or flow enabling position.
Figure 3:
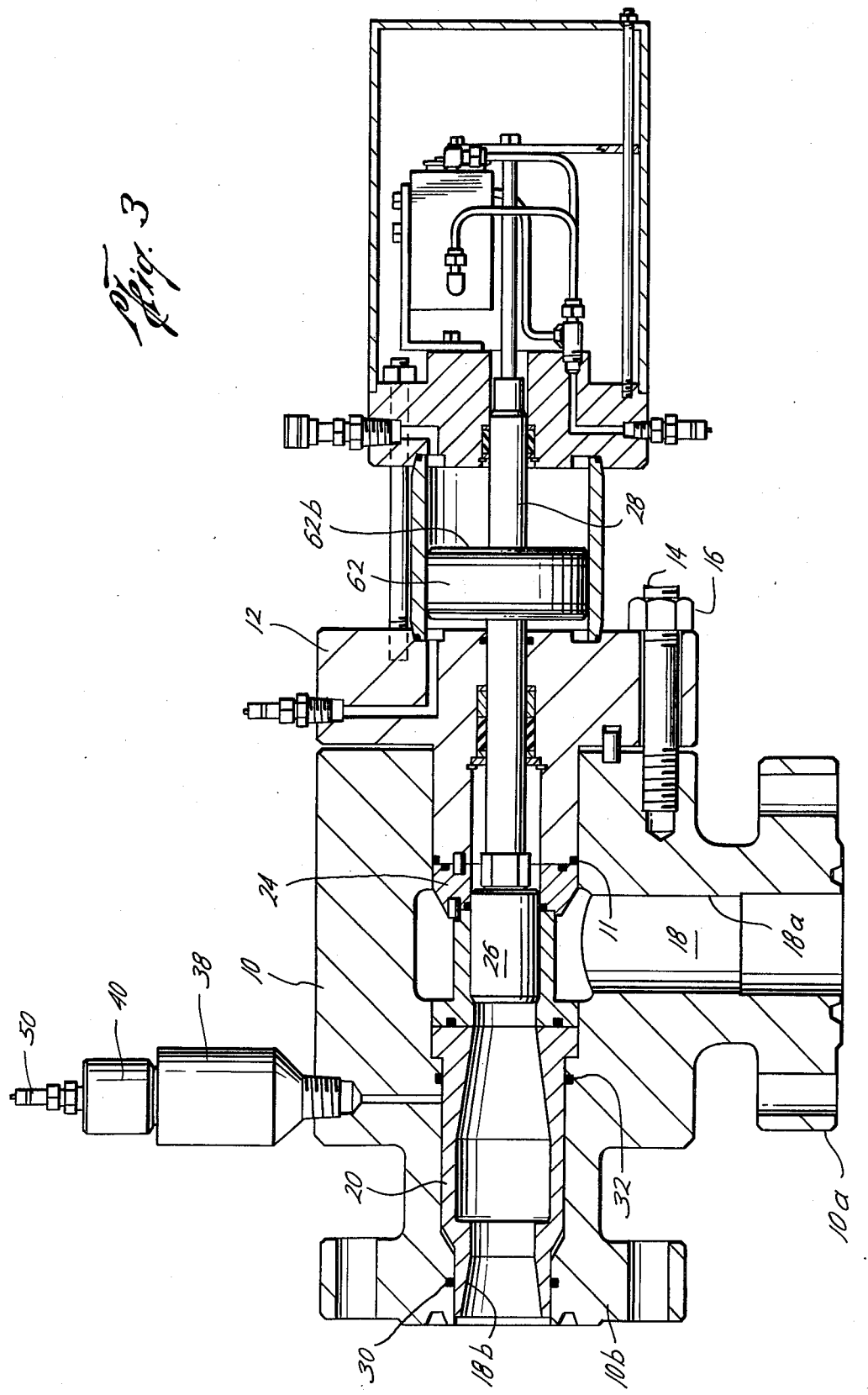
FIG. 3 is a view similar to FIG. 1 of the valve operated to the closed or flow blocking position.

The tubular flow closure element is movable from the first or fully open position illustrated in FIG. 1 for enabling flow of fluid through the ports 22b to the second or closed position illustrated in FIG. 3 for blocking flow through the port 22b. Intermediate these two limit positions, the flow closure element 22 partially covers the ports 22b for regulating the rate of fluid flow through the valve 22. While a triangular port opening 22b is illustrated, it is understood that the shape of the ports 22a will determine the flow response operating characteristics of the valve 10 and that ports 22a of other shapes may also be employed.

The erosion control nozzle 20 is secured by the seat 22 and seal ring 24 engaging the bonnet 12 as described above. The collar 20a formed on the erosion control nozzle 20 engages corresponding annular shoulder formed by the valve body 10 to provide the lower stop for the erosion control nozzle. When secured in the outlet portion 18b, a pair of longitudinally spaced seals 30 and 32 effect longitudinally spaced seals between the valve body 10 and the erosion control nozzle 20. The spaced seals effected by the O-rings 30 and 32 create an operating fluid pressure excluded or isolated area between the valve body 10 and the erosion control nozzle 20. Should the erosion control nozzle 20 develop a leak such as caused by flow erosion or other undesired consequences of the throttled operating fluid flow, fluid pressure in the area between the seals 30 and 32 will increase to the operating fluid pressure level. The presence of such fluid pressure would signal that the erosion control nozzle 20 has failed and that erosion damage to the valve body 10 is about to occur from the throttled flow.

The valve body 10 has a leakage port 10c formed therein which communicates with the normally fluid pressure isolated area between the O-rings 30 and 32. Should the operating fluid pressure enter the isolated area, such pressure will also be communicated through the leakage port 10c. An indicator or signal apparatus generally designated 36 is mounted with the valve body 10 by threadedly engaging threads 10d formed in the outer portion of the leakage ports 10c. The indicator apparatus 36 includes an outer housing member 38 and a closure cap 40 that are secured together by threaded engagement at 41. The outer housing 38 and cap 40 form a central cavity 42 which is placed in communication with the leakage port 10c and isolated area.

Disposed within the central cavity 42 is a fluid responsive piston 44 and a biasing spring 46. The biasing spring 46 urges the fluid piston 44 to the normal or inactive position toward the valve body 10. A signal member 48 is operably associated with the fluid responsive piston and when the fluid responsive piston is in the inactive position illustrated in FIG. 1, the signal member 48 is substantially retracted within the outer housing 38 and end cap 40. When operating fluid pressure communicated through the leakage ports 10c urges on the fluid responsive piston 44 for effecting its movement, the piston will overcome the urging of spring 46 and move the signal member 48 to an indicating position extending from the end cap 40 for providing a signal that the erosion control nozzle 20 is leaking and incipient failure condition exists in the valve body. In the illustrated embodiment the signal member 48 is provided with a bleed closure cap 48a which closes off pneumatic bleed line 50 when moved to the extended or indicating position. With the bleed line 50 closed the pressure will increase in the bleed line 50 for giving a remote indication or signal that incipient failure conditions exist in the valve.

Removably mounted on the valve bonnet 20 is a valve remote actuator or operator, generally designated 60. It is to be understood, however, that a manual valve actuator is equally well suited for operation of the valve apparatus A. Such a remote valve actuator 60 is well known to those skilled in the art and need not be described in extensive detail. In general, the actuator 60 is provided with a fluid responsive piston 62 that is operably connected with the valve stem 28 to effect its reciprocating motion and thereby effect the operating movement of the flow closure element 26 relative to the flow ports 22 in the usual manner. In the illustrated embodiment fluid pressure acting on the lower side 62a of the piston 62 will urge the piston 62 to move upwardly. This will move the flow closure element 26 upwardly to the open position. Fluid pressure introduced above the operating piston 62 will act on the pressure responsive surface 62b and will urge the piston 62 and stem 28 with the flow closure element 26 downwardly to the closed position for shutting off flow through the valve apparatus A in the usual manner. Suitable operating condition position indicator mechanism, generally designated 64, may be connected with stem extension 28a for providing a remote signal of the operating condition of the valve A to ensure that it is properly responding to remote commands.

OPERATION OF THE PRESENT INVENTION

In the use and operation of the present invention the valve A is assembled in the manner indicated and connected in the flow conduit for controlling the flow of fluid. Control fluid pressure urging on the actuator piston 62 will control movement of the valve stem 28 and the connected flow closure element 26 to control flow through the port 22b in the usual manner. When the flow closure element 26 is in the open or partially open position operating fluid flow will pass through the inlet portion 18 and through the flow port 22b of the tubular seat 22 into the central cavity 22a. The flow is then downwardly through the erosion control nozzle 22 and out of the valve A.

When the operating fluid flow throttled through the flow port 22 erodes or otherwise causes leakage of fluid into the isolated area between the seals effected by the O-ring 30 and 32 with the erosion control nozzle 20, the increased fluid pressure will be communicated through the leakage port 10c to the fluid responsive piston 44. Movement of the fluid responsive piston 44 overcomes the urging of the biasing spring 46 for extending the signal member 48 to provide a signal that the incipient failure or leakage condition exists. When the remote indicator bleed line 50 is employed, the closure 48a will enable pressure build-up in the remote indicator line 50 to remotely indicate the leakage condition exists at the valve.

The foregoing disclosure and description of the invention are illustrative and explanatory thereof, and various changes in the size, shape and materials, as well as in the details of the illustrated construction may be made without departing from the spirit of the invention.

We claim:

1. A fluid flow control valve adapted for use in severe operating conditions encountered during earth drilling operations including:
    a valve housing having a valve body and a valve bonnet, said valve body having means for connecting in a flow containing conduit to form a portion thereof, said valve body having a flow passage formed therethrough which is secured by said means for connecting in flow communication with the flow containing conduit for enabling the flow of contained fluid through said flow passage, said flow passage having an inlet portion defining an inlet longitudinal axis and an outlet portion defining an outlet longitudinal axis;
    said valve bonnet releasably secured to said valve body and having an opening formed therethrough to provide clearance for a valve stem means to extend from said flow closure element exteriorly of said valve housing;
    tubular seat means having a central opening, said seat means disposed in said flow passage for forming a sealable flow port through which fluid flow through said flow passage is directed, said flow port arranged in said tubular seat means for directing the flow of throttled fluid radially inwardly into said central opening of said tubular seat means when flowing through said flow passage;
    a flow closure element disposed in said flow passage for operating movement to and from a first position sealing with said seat means for blocking flow of fluid through said flow port and a second position for enabling flow of fluid through said flow port;
    an erosion control nozzle disposed in said flow passage adjacent said tubular seat means, said erosion control nozzle protecting said valve housing from the damaging effects of the throttled flow of flow from said central opening of said tubular seat means, said tubular seat means and erosion control nozzle disposed in said outlet portion;
    means sealing said erosion control nozzle with said valve housing at spaced locations to isolate said housing from contact with the throttled fluid flowing through said flow passage;
    indicator means communicating with said flow passage isolated by said means for sealing between said erosion control nozzle and said valve housing at spaced locations for signaling fluid leakage adjacent said erosion control nozzle;
    valve stem means operably mounted with said housing and operably connected with said flow closure element for moving said flow closure element to and from the first and second positions for controlling flow of fluid through said flow passage, said valve stem means includes a rod extending through said opening in said bonnet and sealed with said bonnet to block leakage of fluid therebetween; and
    actuator means mounted with said housing for operating said valve stem means to move said flow closure element to and from the first and second position in response to command signals transmitted to said actuator means wherein said actuator means controls the position of said flow closure element to control the flow of fluid through said flow port.

2. The fluid flow control valve as set forth in claim 1, wherein:
    said tubular seat means is secured in said outlet portion of said flow passage by said valve bonnet;
    said flow closure element moving along said longitudinal axis of said outlet portion for controlling the size of said sealable flow port through which fluid may flow inwardly into said central opening of said tubular seat means wherein the flow of fluid through said flow port is regulated.

3. The fluid flow control valve as set forth in claim 1, wherein:
    said indicator means having a housing releasably secured to said valve body, said housing forming a central cavity and carrying a movable signal member;
    said valve body having a leakage port for communication said central cavity with the housing area isolated by the spaced seals with the erosion control nozzle;
    said indicator means having a fluid pressure responsive piston and a biasing spring disposed in said central cavity, said piston operably connected with said signal member for moving said signal member, said biasing spring urging said piston to retract said signal member from a signaling position, said piston responsive to leakage of fluid into said housing area isolated by the spaced seals with the erosion control nozzle to move said signal member to the signaling position for indicating the undesired leakage.

4. The fluid flow control valve as set forth in claim 3, wherein:
    said signal member in the signaling position actuates a means for indicating the undesired leakage at a location remote from the valve housing.

* * * * *